United States Patent
Agnello

(10) Patent No.: US 7,381,927 B1
(45) Date of Patent: Jun. 3, 2008

(54) OVEN FOR COOKING CONE-SHAPED FOODS

(75) Inventor: Frank Anthony Agnello, South Elgin, IL (US)

(73) Assignee: Prince Castle Inc., Carol Stream, IL (US)

( * ) Notice: Subject to any disclaimer, the term of this patent is extended or adjusted under 35 U.S.C. 154(b) by 11 days.

(21) Appl. No.: 11/590,091

(22) Filed: Oct. 31, 2006

(51) Int. Cl.
*A21B 1/42* (2006.01)
*A21B 3/07* (2006.01)
*F27B 9/16* (2006.01)
*B65G 17/36* (2006.01)

(52) U.S. Cl. .................... 219/388; 219/392; 99/443 C; 198/465.2

(58) Field of Classification Search ............. 198/465.2
See application file for complete search history.

(56) References Cited

U.S. PATENT DOCUMENTS

| | | | | |
|---|---|---|---|---|
| 1,620,120 A | * | 3/1927 | Morshead et al. | 198/465.2 |
| 1,690,439 A | * | 11/1928 | Wigglesworth | 198/346.1 |
| 2,465,611 A | * | 3/1949 | Singer | 198/684 |
| 2,517,360 A | * | 8/1950 | Singer | 99/421 R |
| 2,535,393 A | * | 12/1950 | Daugert | 392/435 |
| 2,631,216 A | * | 3/1953 | Ames | 324/418 |
| 2,678,372 A | * | 5/1954 | Salton | 219/220 |
| 2,718,188 A | * | 9/1955 | Read et al. | 99/386 |
| 2,745,363 A | * | 5/1956 | Balton | 425/334 |
| 3,744,403 A | * | 7/1973 | Castronuovo | 99/421 V |
| 5,006,355 A | * | 4/1991 | Stuck et al. | 426/243 |
| 5,173,320 A | * | 12/1992 | Stuck et al. | 426/523 |
| 5,176,068 A | * | 1/1993 | Stuck et al. | 99/443 C |
| 5,688,466 A | * | 11/1997 | Mitchell et al. | 264/458 |
| 6,005,223 A | * | 12/1999 | Ogihara | 219/388 |
| 6,523,462 B1 | * | 2/2003 | Johnson et al. | 99/443 C |
| 7,013,080 B1 | * | 3/2006 | Kaplanis et al. | 392/422 |

* cited by examiner

*Primary Examiner*—Joseph M Pelham
(74) *Attorney, Agent, or Firm*—Ladas & Parry LLP

(57) ABSTRACT

A horizontal carousel conveyor carries cone-shaped foods and other specialty-shaped foods through an oven, rotating the food on a heating station as it passes by heating elements and through the oven.

14 Claims, 10 Drawing Sheets

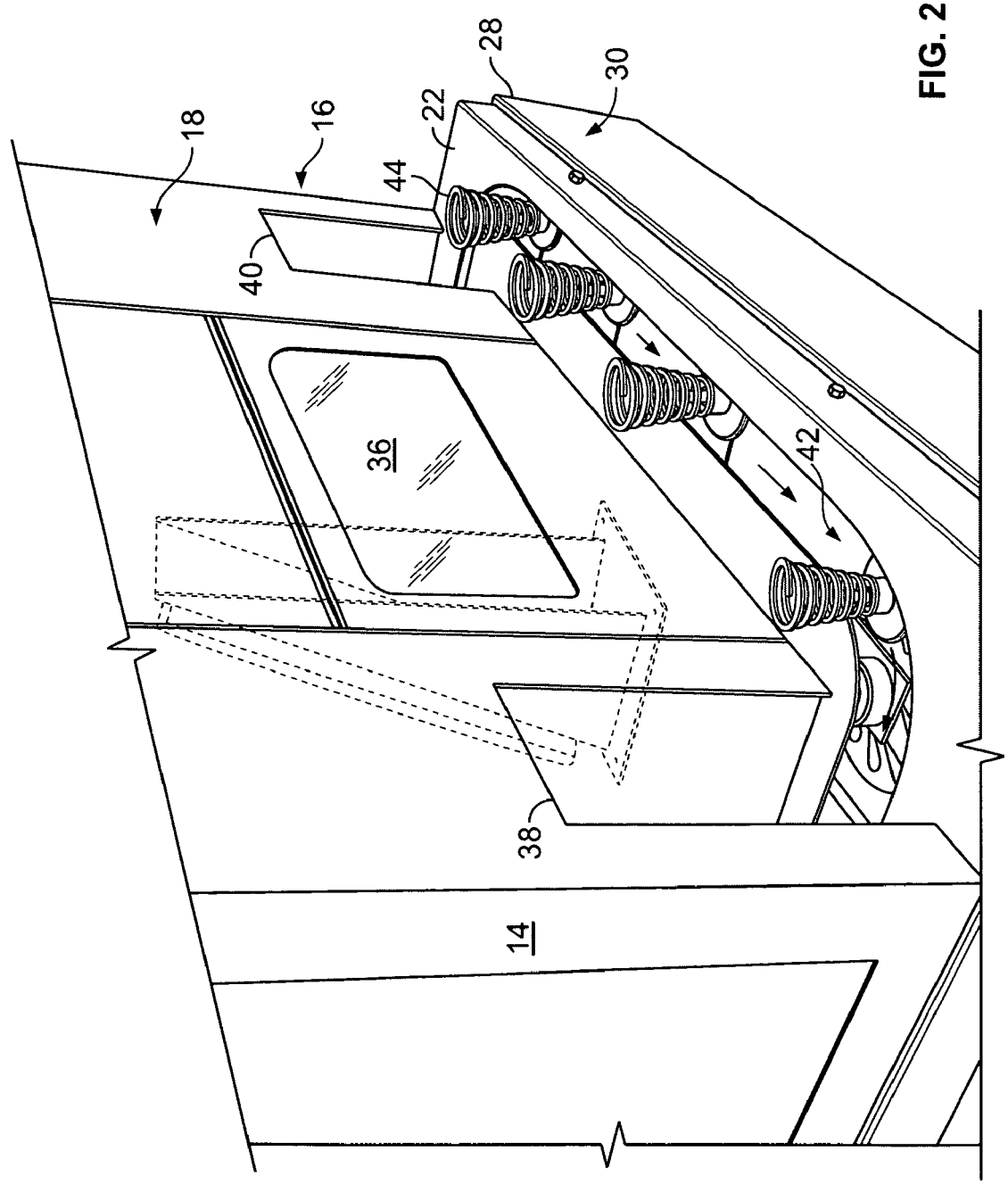

OVEN FOR COOKING CONE-SHAPED FOODS

BACKGROUND

Restaurants and food service providers that provide unusual or unique foodstuffs often have a competitive advantage over business that do not otherwise distinguish themselves. Because most restaurants and food service providers cook or heat foodstuffs for consumption before they are sold or served to a customer, the ability to quickly and properly heat or cook a unique food item can be important to the success of a food service business.

As used herein, the term "pizza cone" refers to an edible cone, the interior of which is filled with pizza fillings, such as meats, cheeses and other ingredients. The cone part of a pizza cone is usually made from pizza dough, however, cones made from other types of dough can also be filled with pizza fillings or other foods.

Because of its shape, a pizza cone is particularly difficult to heat and/or cook. If a cone is place on its "side" for cooking, fillings inside the cone will spill or fall out of the cone as temperature rises. If a cone is inverted so that the open end is downward and placed on a flat surface for heating, the contents will also spill when the cone is removed from a heating surface to be turned upright. The best way to heat a filled cone is to heat the cone while it is upright, i.e., with the pointed, narrow end of the cone downward, in order to keep fillings in the cone as it the cone is heated.

A problem with heating and/or cooking edible cones is that their conical shape makes it difficult to evenly heat a cone from top to bottom. A cone is also difficult to heat around its perimeter. An oven that can uniformly heat a cone from top to bottom and uniformly heat a cone completely around its perimeter would be an improvement over the prior art.

BRIEF DESCRIPTION OF THE DRAWINGS

FIG. 2 shows a perspective view of the front side of an oven showing a view of a horizontal carousel conveyor that carries cone-shaped heating stations used to carry cone-shaped foods through the oven;

DETAILED DESCRIPTION

Figure 1:
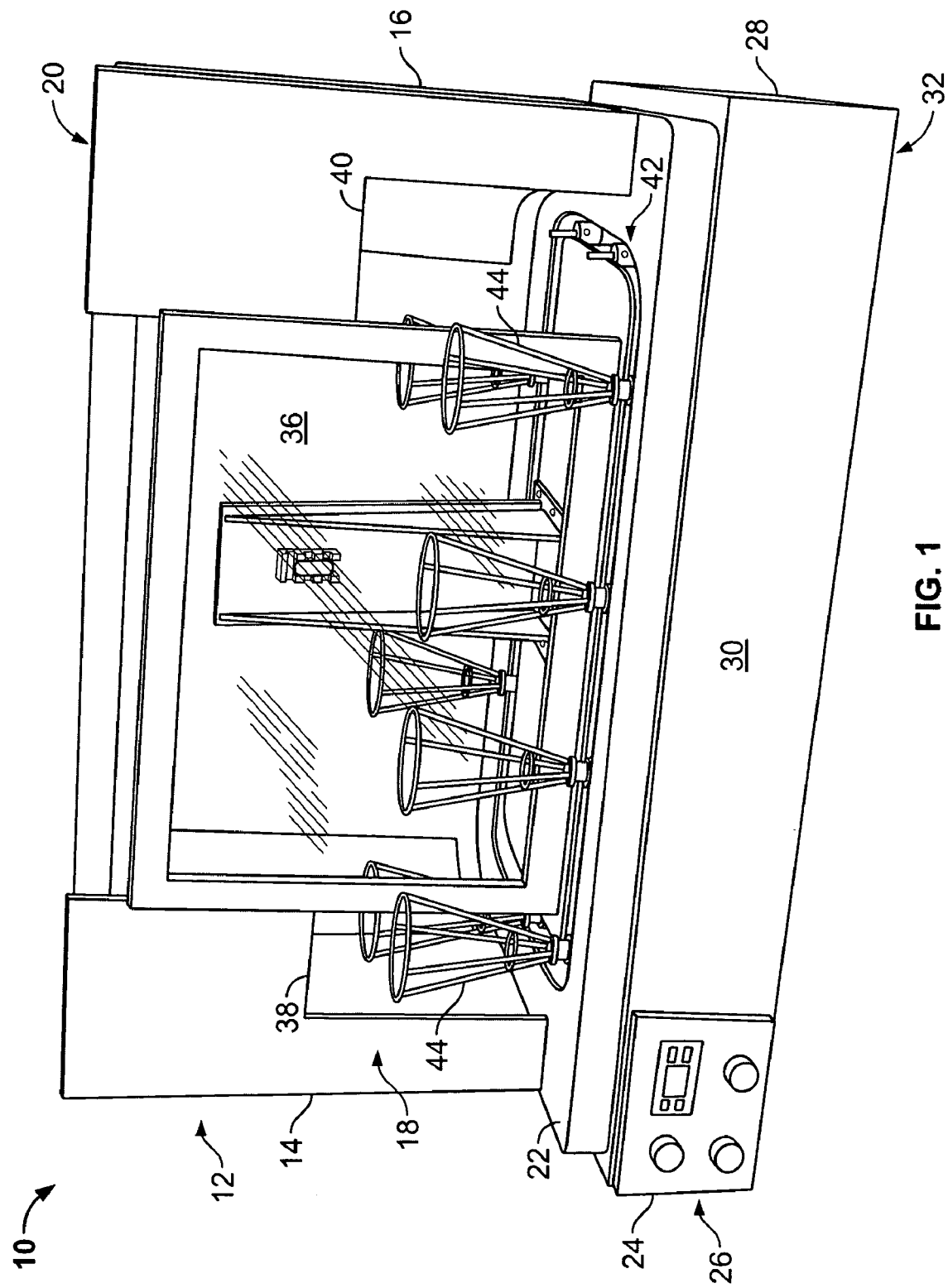
FIG. 1 shows a front elevation view of an oven for baking cones and cone-shaped foods.

FIG. 1 shows a rectangular-shaped oven 10 particularly suited for baking cone-shaped dough and/or batter in order to cook cone-shaped foodstuffs such as pizza cones and ice cream cones. As set fort more fully below, the oven 10 can be readily adapted to cook other shaped food stuffs.

As best seen in FIG. 1, the oven 10 has an upper housing or box 12 having four sides, (left 14, right 16, front 18, and rear, not shown) and a top 20. The sides and top are insulated to keep heat within the oven's interior and to keep the exterior surfaces of the sides and top cool to the touch.

The upper housing 12 is attached to the top surface 22 of a base unit 24. In one embodiment, the upper housing 12 is attached to the base unit 24 by a hinge that is attached to the base unit 24 along the top rear edge (not shown) of the base unit 24 and the lower rear edge of the upper housing 12. The hinge between the upper housing 12 and the base unit 24 allows the upper housing 12 to be pivoted upwardly in order to provide access to the interior of the oven 10.

The base unit 24 has a left side 26, a right side 28, a rear side (not shown), a front side 30, a top 22, and a bottom 32. As can be seen in FIG. 1, the width of the upper housing 12 and the width of the base unit 24 are substantially equal such that the left and right sides of the upper housing 12 and the base unit 24 are substantially co-planar.

While the width of the upper housing 12 and the base unit 24 are the same, the depth of the base unit 24, is greater than the depth of the upper housing 12. The greater depth of the base unit 24 over the depth of the upper housing 12 provides a shelf surface 34 that extends forwardly of the front side 18 of the upper housing 12. In one embodiment, the front shelf 34 extends past the front side 18 of the upper housing 12 by about six inches.

In the embodiment of the oven 10 shown in FIG. 1, the front side 18 of the upper housing 12 is provided with a viewing window 36 by which an operator can view the cooking progress of cones or other food stuffs passing through the oven 10. The viewing window 36 is preferably made from a translucent, heat-tolerant glass or other translucent heat-tolerant material, such as quartz.

Importantly, the front side 18 of the upper housing 12 is provided with two passage ways or openings 38 and 40. The openings 38 and 40 are spaced apart from each other in the front side 18 so as to be located proximate to the left-hand side 14 and the right hand side 16 respectively.

Figure 4:
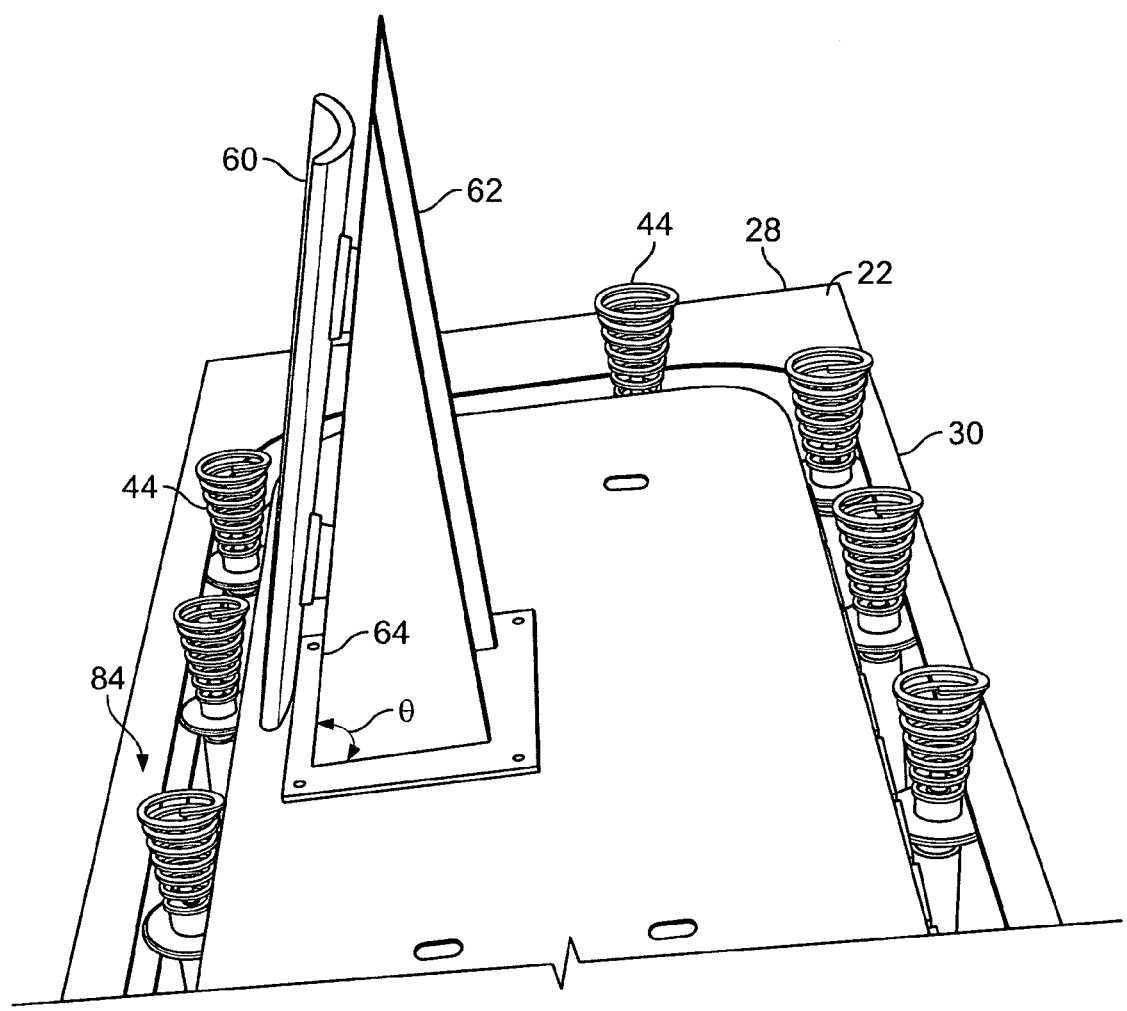
FIG. 4 shows a perspective view of the oven shown in FIG. 1 and FIG. 2 with the oven's upper housing removed to show the routing of the carousel conveyor and an inclined heating element used to heat cones.
Figure 5:
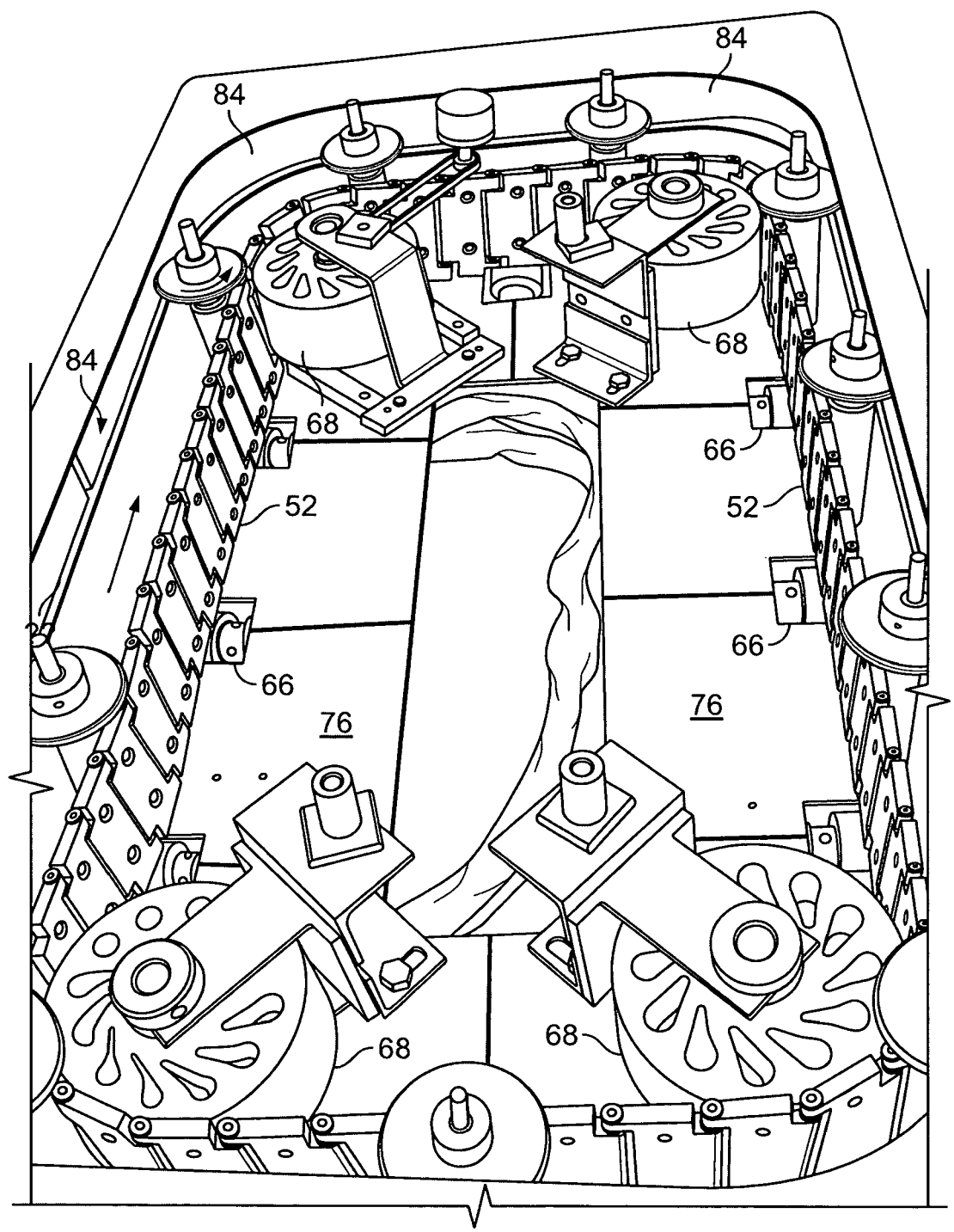
FIG. 5 shows a perspective view of the oven's base unit as viewed from the left side of the oven with the top of the oven's base unit removed to show details of the horizontal carousel conveyor.

A motor-driven, variable speed conveyor mechanism enclosed in the base unit 24 provides a closed-loop, horizontal carousel conveyor 42 (hereafter conveyor 42) by which heating stations 44 attached to the conveyor are carried through the oven 10 in order to cook foodstuffs in or on a heating station. As shown, the heating stations 44 are vertically-oriented and sized, shaped and arranged to hold cone-shaped items upright, i.e., with the narrow, pointed end downwardly. The heating stations 44 pass into the oven 10 through a first one of the openings (38 or 40) and out from the oven through the other opening (34 or 32). As can be seen in FIGS. 1, 2 and 4, the several heating stations 44 attached to the conveyor 42 travel in the same, substantially-horizontal geometric plane enabling the heating stations 44 and cones carried on them to pass one or more vertically-oriented heating elements in the oven 10.

Figure 3A:
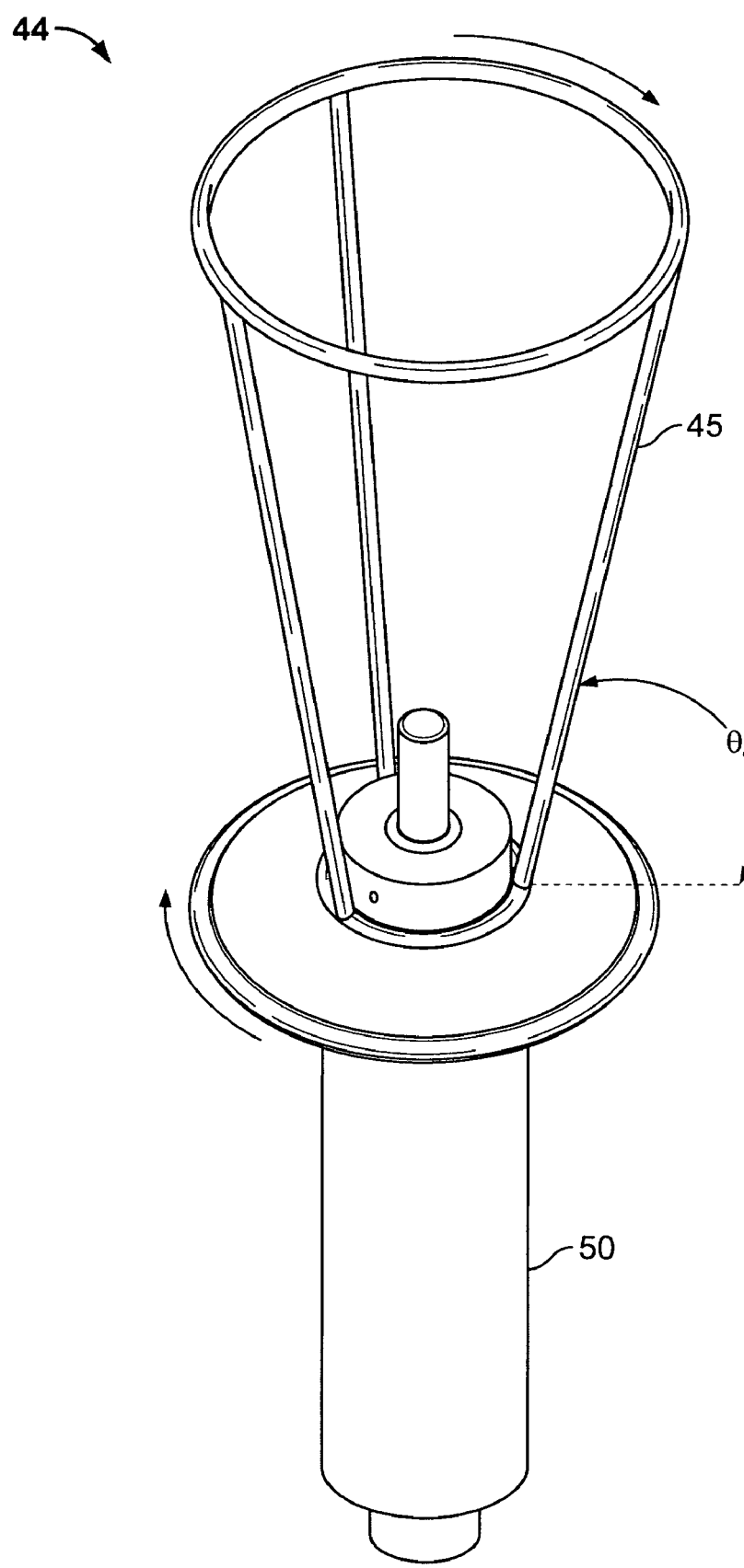
FIG. 3A shows one embodiment of a heating station for use in cooking or heating cone-shaped foods.
Figure 3B:
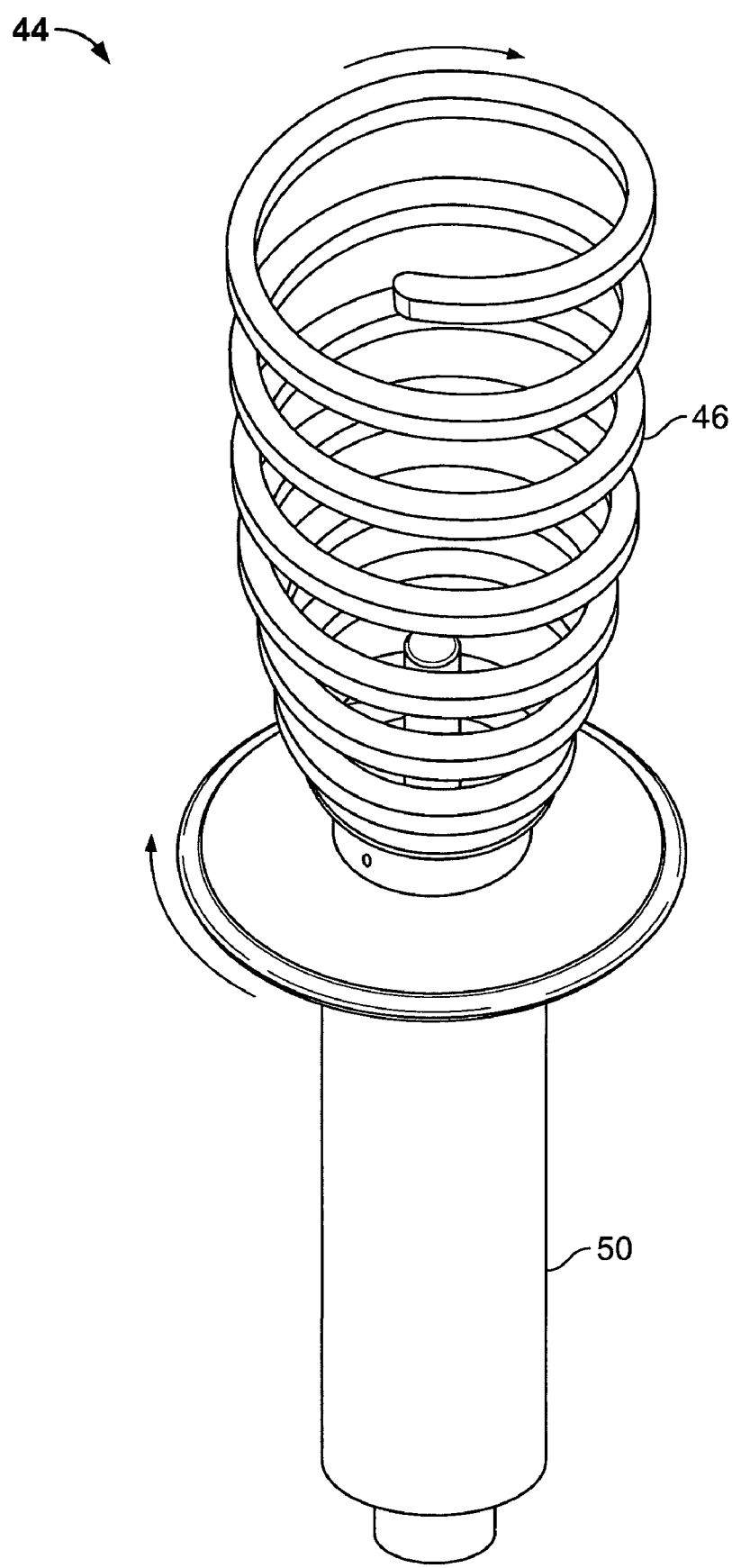
FIG. 3B shows a second embodiment of a heating station for use in cooking or heating cone-shaped foods.

Referring to FIGS. 3A and 3B, the heating stations 44 in one embodiment are cone-shaped wire baskets 45 having a geometric center axis of symmetry (not shown). When the basket 45 is attached to a mandrel 50 that is attached to a link of the conveyor 42, the center axis of symmetry extends upward, orthogonal to the upper surface 22 of the base unit 24. In a second embodiment, the heating stations 44 are cone-shaped wire springs 46, which have a geometric central axis (not shown) about which the coils of the springs are wound. By placing a cone-shaped food item within a cone-shaped basket or a cone-shaped coil, heat is able to reach the cone to cook it as the basket or coil preserves the integrity of the cone.

Figure 6:
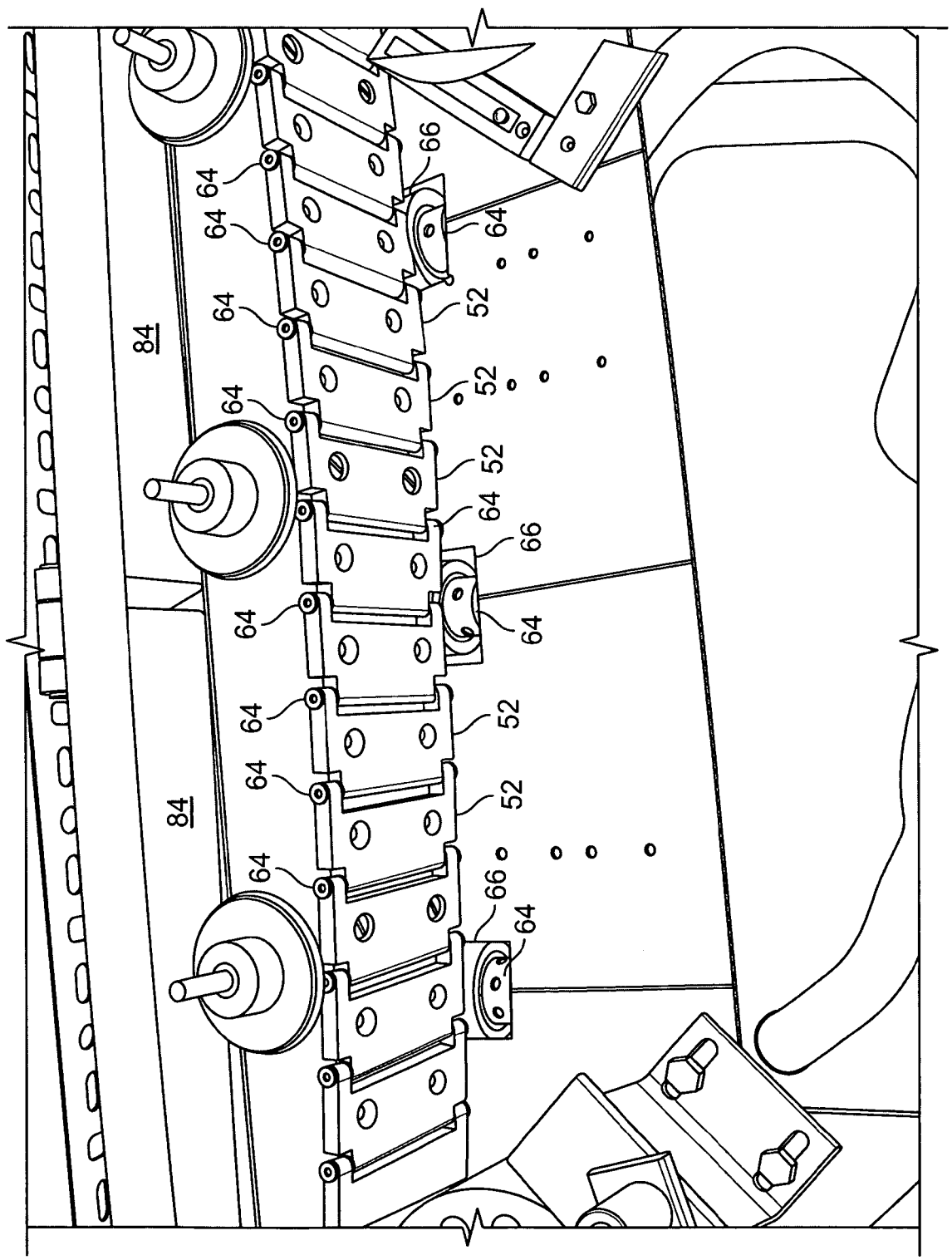
FIG. 6 shows a perspective view of the oven's base unit as viewed from the front of the oven with the top of the base unit removed to show additional details of the carousel conveyor.
Figure 7:
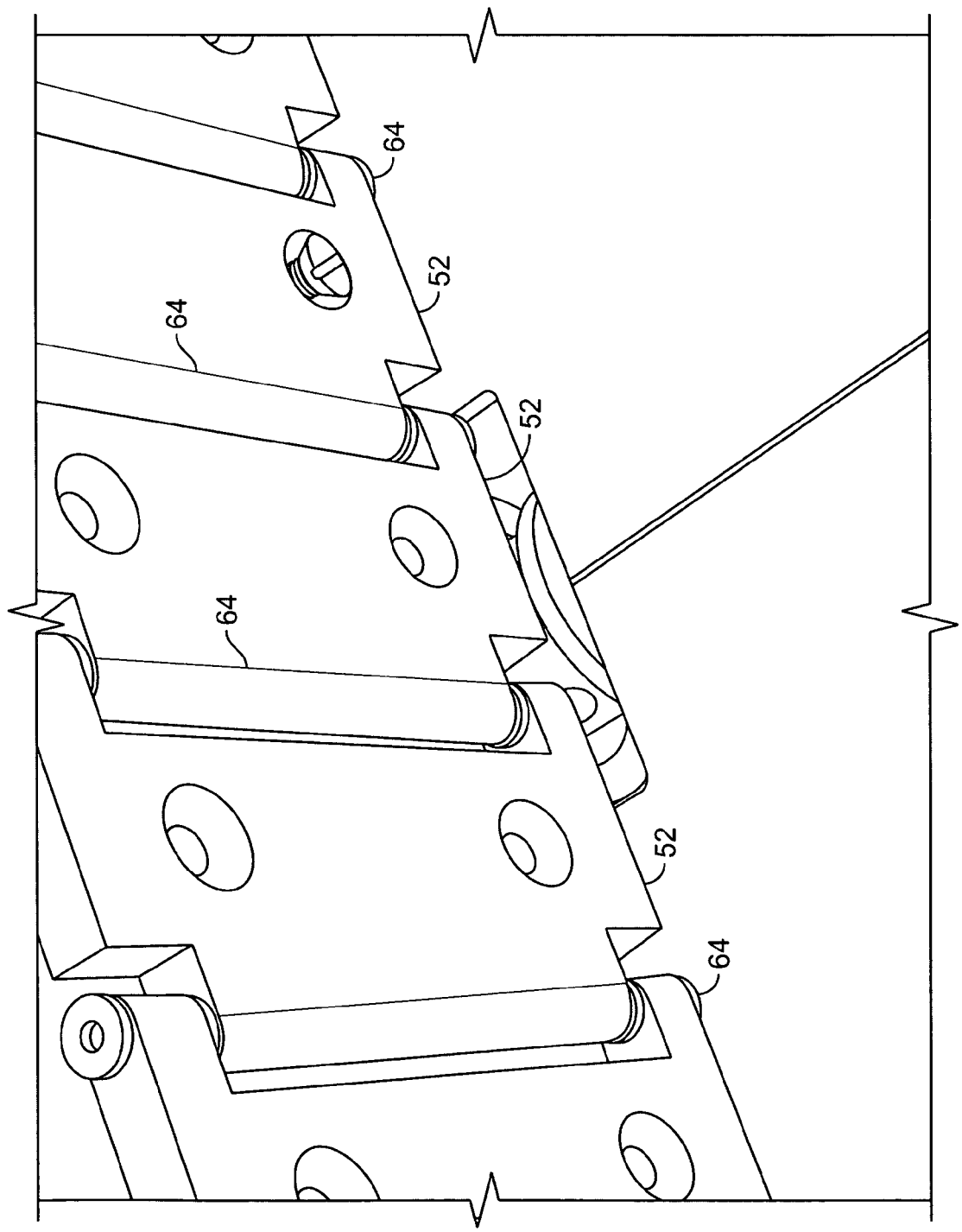
FIG. 7 shows the attachment of the links to each other and how the links of the carousel conveyor ride in and are guided by roller bearings.
Figure 8:
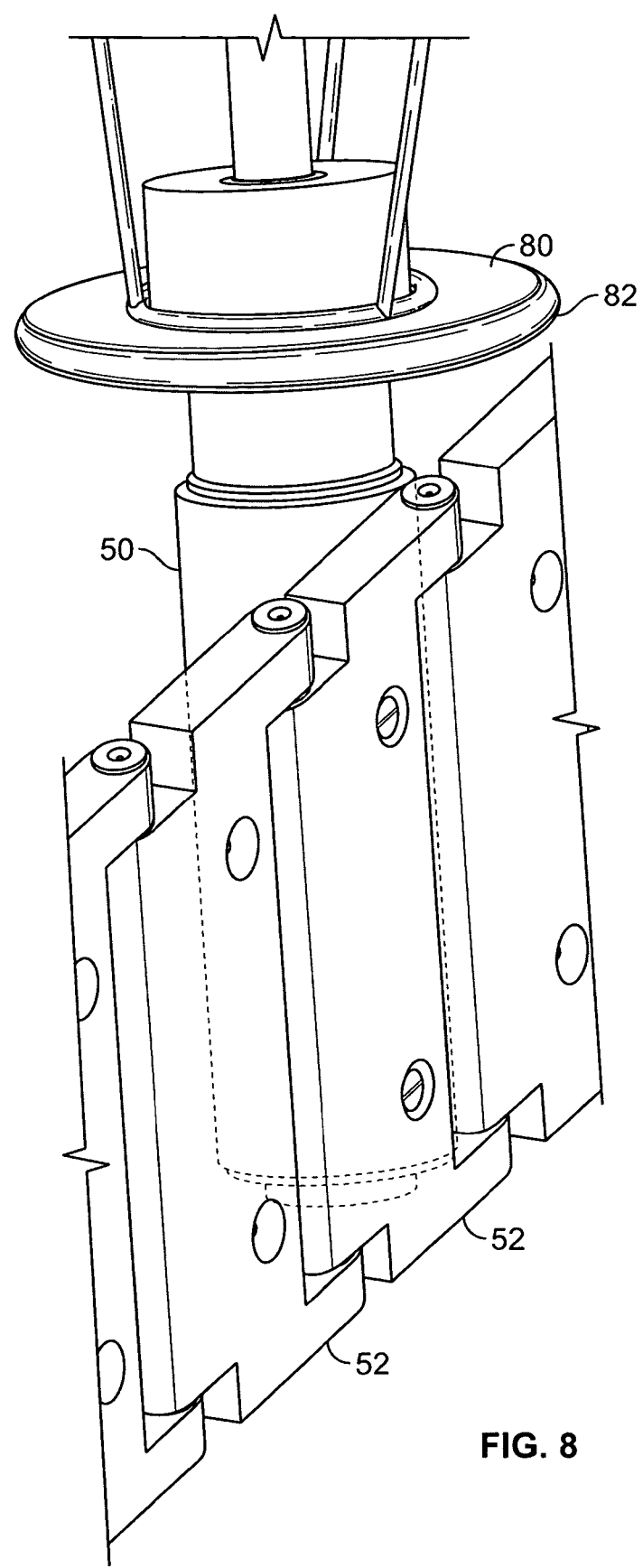
FIG. 8 shows the mounting of a heating station to a link of the carousel conveyor.
Figure 9:
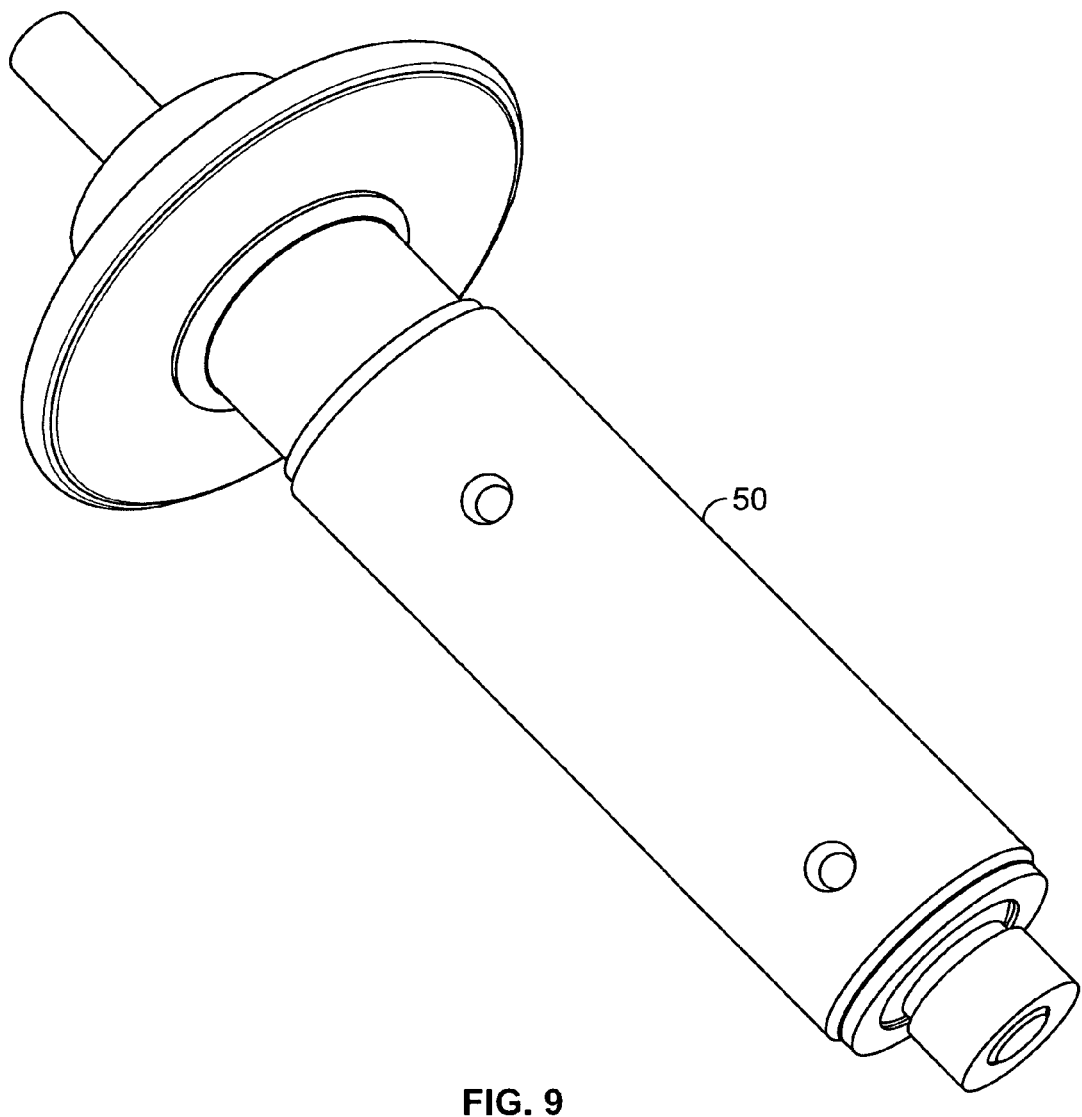
FIG. 9 depicts the mounting holes in the heating station base, by which the heating station is attached to a conveyor link.

As can be seen in FIGS. 3A and 3B, the heating stations are attached to a heating station carrier mandrel 50. As can be seen in FIGS. 6, 7 and 8, the mandrel 50 is then attached to an individual link 52 of the conveyor 42 so that as the conveyor 42 wends its way around the base unit 24, the heating station 44 also moves around the base unit 24. As best seen in FIGS. 9 and 10, two holes 52 and 54 in the heating station mandrel 50 allow the heating station 44 to be attached to conveyor links by machine screws, rivets or sheet metal screws thereby enabling their removal for service. In an alternate embodiment, however, the heating station mandrel 50 could be welded to a link.

FIG. 4 shows a perspective view of the interior of the oven 10, i.e., with the upper housing 12 detached and removed from the base unit 24 to reveal details of the conveyor's routing through the oven 10. As can be seen in FIG. 4, a heater element 60 is mounted to a triangularly-shaped sheet metal heater support bracket 62. Although a single inclined heater element 60 is shown, alternate embodiments of the oven 10 include the use of multiple inclined heater elements. In one alternate embodiment, one or more heater elements are provided both inside and outside the conveyor loop. In yet another embodiment, no heater element is within the loop and one or more heater elements are provided outside the conveyor loop.

The heater element 60 can be implemented using a gas burner, electrically heated quartz, a resistive heating element, or a combination of any two or more of them. The heater support bracket 62 is attached to the top surface 22 of the base unit 24 so that the hypotenuse side 64 of the bracket 62 is closest to the conveyor 42. In the embodiment shown in FIG. 4, the heating stations 44 pass between the heating element 60 and the rear or back side of the oven's upper housing 12. Heat from the heater element 60 is therefore directed rearward, i.e., toward the rear side or back of the oven's upper housing 12 and away from the viewing window 36 in the front side. The rear-ward direction of the heating element 60 away from the window 36 tends to reduce the transmission of infrared heat from the oven.

The hypotenuse side 64 of the heater support bracket 62 is shown in the figure to be inclined at an angle θ with respect to the top surface 22 of the base unit 24. The angle θ corresponds to the angle formed by the "sides" of the cooking stations 42 with respect to the upper surface 30 of the base unit 24. By inclining the heater element 60 to the inclination angle of the cooking stations 42 or the inclination of a shaped food stuff, heat from the heater element 60 is directed horizontally toward foodstuffs on the heating stations 44 that pass in front of the heater element 60. In most cone applications, the angle θ is between about 10 and 30 degrees.

An advantage to inclining the heating element 60 is that foodstuffs carried on the heating stations that are also "angled," are heated more uniformly. Put another way, if the heater element 60 was not inclined and if the axis of a cone passing in front of the heating element 60 was also not inclined, evenly heating a cone-shaped foodstuff would be problematic. If the heating element 60 were vertical and if the cone's axis was also vertical, the wide part of a cone would be too close to the heating element 60, or the narrow pointed end would be too far from the heating element to evenly heat a cone from top to bottom. Portions of a cone farther away from the heating element 60 would either be undercooked while portions of a cone close to the heating element 60 would be overcooked or over heated. By inclining or tilting the heating element 60 as shown, horizontally-directed heat from the heating element 60 enables a cone shaped foodstuff or a cone filled with foodstuffs to be heated more uniformly from top to bottom.

FIG. 6 shows a top view of the base portion 24 of the oven 10 but with the top surface 22 removed to expose details of the horizontal conveyor 42, which is formed from several vertical belt links 52 joined to each other by vertically-oriented hinge joints 64. As can be seen in the figure, the belt links 52 are rectangular plates. The vertical orientation of the hinge joints allows the links 52 to form a continuous belt, which can travel horizontally around a pathway and thus move items, such as heating stations that carry food stuffs, in a horizontal plane.

The assembled belt links 52 that form the continuous, closed loop horizontal conveyor 42 ride in journals of bearings 66 that are placed around the interior of the base unit 24 to define the conveyor's pathway. The conveyor's links 52 are held upright and under a moderate tension by pliable rollers 68 located at each corner 70 of the base unit 24.

The tension exerted on the conveyor 42 is provided by the resilient material from which the rollers 68 are formed. The amount of tension exerted on the conveyor 42 keeps the conveyor 42 frictionally engaged to the rollers 68.

Inasmuch as the conveyor 42 is part of an oven, oven components, including the conveyor, are made from heat-tolerant materials. In one embodiment, the links 62 of the conveyor were made from aluminum plate. The pliable rollers were formed from polyester.

The conveyor 42 is driven by a motor located beneath the bottom of a plate 76 so as to be protected from heat emanating from the upper portion of the oven. The motor is preferably a variable speed motor in order to provide some control over foodstuff heating other than by the heat energy provided by the heating element 60.

Referring now to FIGS. 8 and 9, the structure of a heating station 42 is shown in greater detail. The heating station 42 has the cone-shaped basket or coil attached to a mandrel 50, the top of which is formed to have relatively large diameter wheel 80 having a central axis of rotation. The outer circumference of the wheel 80 is formed to have a chamfer into which a heat-resistant nylon or neoprene O-ring 82 is placed. When a heating station 42 is attached to a conveyor link 52, the O-ring 82 will frictionally engage a sheet metal drive plate 84 that runs along the pathway traced out by the O-rings 82 as the mandrel is carried around the pathway of the conveyor 42. The drive plate 84 is adjustable and moved inwardly so that the O-rings ride against the drive plate to cause the wheel 80 and the attached heating station 42 to rotate as the heating station 42 moves. Thus, when the conveyor 42 moves, the heating station 42 rotates, so long as there is a drive plate 84 that is engaged by the O-ring 82.

As shown in FIG. 6, the drive plate extends from the left side of the base unit 24, across the back of the base unit 24 and part way up the right side 28 of the base unit 24 in order to rotate the heating stations 42 as they move through the upper housing 12 of the oven 10 and past the heating element 60.

While the description above is of one embodiment, the true scope of the invention is set forth in the following claims.

What is claimed is:

1. An oven comprising:
   a. a housing having an inlet and an outlet;
   b. a heating element within the housing that directs thermal energy substantially horizontally; and
   c. a carousel conveyor lying in a substantially horizontal plane and carrying foodstuffs around a continuous, horizontally-oriented loop, the foodstuffs passing into the housing through the inlet, past the heating element and back outside the housing through the outlet; and
   d. a substantially cone-shaped heating station that is removably attached to the carousel conveyor and extending upwardly from said horizontal plane, said substantially cone-shaped heating station for carrying foodstuffs through the housing and past the heating element.

2. The oven of claim 1 wherein said heating station has a center axis and rotates about a vertical axis as it moves along the loop.

3. The oven of claim 1 wherein said heating station has a center axis and rotates about a vertical axis only while it moves through the housing.

4. The oven of claim 1 wherein said heating element is inclined at an angle substantially equal to an inclination angle of the cone-shaped heating station.

5. The oven of claim 1 wherein said heating element is located along the pathway of the conveyor between the inlet and outlet.

6. The oven of claim 1 further comprising a speed motor coupled to the carousel conveyor and driving said carousel conveyor.

7. The oven of claim 1 wherein said carousel conveyor is comprised of metal links.

8. An oven comprising:
   a. a thermally insulated housing having first and second openings;
   b. a first heating element within the housing and positioned between the first and second openings, said heating element directing thermal energy substantially horizontally; and
   c. a carousel conveyor forming a closed horizontal loop, said carousel being sized, shaped and arranged to carry foodstuffs around a continuous, horizontally-oriented loop that runs into the housing through the first opening, past the heating element and back out from the housing through the second opening, said carousel having a substantially cone-shaped heating station, removably attached to the carousel conveyor, said substantially cone-shaped heating station carrying foodstuffs through the housing as the carousel conveyor moves.

9. The oven of claim 8 wherein said heating station extends vertically from the conveyor and rotates about a vertical axis.

10. The oven of claim 8 wherein said heating station extends vertically from the conveyor and rotates about a vertical axis only when it moves through the housing.

11. The oven of claim 8 further comprising a variable speed motor coupled to the carousel conveyor and driving said carousel conveyor.

12. The oven of claim 8 wherein said first heating element is mounted inside the housing and inside the conveyor loop.

13. The oven of claim 8 wherein the first heating element is inside the conveyor loop and a second heating element is located inside the housing and outside the conveyor loop.

14. An oven comprising:
   a. a substantially rectangular and thermally-insulated housing having first and second openings in a first side of the housing;
   b. a carousel conveyor forming a closed horizontal loop, said carousel being sized, shaped and arranged to carry foodstuffs on a substantially cone-shaped heating station that extends vertically from a horizontal plane and which is attached to the carousel conveyor, around a continuous path that extends from outside the housing, into the housing through the first opening and back out from the housing through the second opening; and
   c. a heating element located within the housing and along the positioned the horizontal loop, said heating element directing thermal energy substantially horizontally.

* * * * *